United States Patent
Matsuda et al.

(10) Patent No.: US 7,401,630 B2
(45) Date of Patent: Jul. 22, 2008

(54) WHEELCHAIR, WHEEL FOR WHEELCHAIR, AND METHOD OF PRODUCING WHEEL FOR WHEELCHAIR

(75) Inventors: Yasushi Matsuda, Daito (JP); Tadashi Yasui, Daito (JP); Kaoru Hoshide, Shinagawa-ku (JP); Takashi Ogata, Shinagawa-ku (JP)

(73) Assignee: THK Co., Ltd., Tokyo (JP)

( * ) Notice: Subject to any disclaimer, the term of this patent is extended or adjusted under 35 U.S.C. 154(b) by 175 days.

(21) Appl. No.: 10/557,278

(22) PCT Filed: May 20, 2004

(86) PCT No.: PCT/JP2004/007214
§ 371 (c)(1), (2), (4) Date: Nov. 17, 2005

(87) PCT Pub. No.: WO2004/103241
PCT Pub. Date: Dec. 2, 2004

(65) Prior Publication Data
US 2006/0244227 A1    Nov. 2, 2006

(30) Foreign Application Priority Data
May 20, 2003    (JP)    ............... 2003-142561

(51) Int. Cl.
*B60B 9/10*    (2006.01)
*B60B 9/18*    (2006.01)
(52) U.S. Cl. .......................... 152/44; 152/53
(58) Field of Classification Search ............... 152/5–9, 152/17, 29–30, 40, 44, 53, 155, 157–159; 295/11–12
See application file for complete search history.

(56) References Cited
U.S. PATENT DOCUMENTS

| | | | | | |
|---|---|---|---|---|---|
| 561,738 | A | * | 6/1896 | Terry ............................. | 152/53 |
| 607,695 | A | * | 7/1898 | Moore et al. .................. | 152/53 |
| 634,954 | A | * | 10/1899 | McKinnon et al. ........... | 152/44 |
| 832,950 | A | * | 10/1906 | Bell .............................. | 152/44 |
| 1,178,599 | A | * | 4/1916 | Rasch .......................... | 152/53 |
| 1,496,235 | A | * | 6/1924 | La Grave ..................... | 152/44 |
| 1,508,301 | A | * | 9/1924 | Schlatter ...................... | 152/44 |

(Continued)

FOREIGN PATENT DOCUMENTS

JP    47-32550    11/1972

(Continued)

*Primary Examiner*—Jason R Bellinger
(74) *Attorney, Agent, or Firm*—Jordan and Hamburg LLP (57) ABSTRACT

A wheel for a wheelchair according to the present invention includes: an outer wheel or ring mounted on the inner periphery of a tire; an inner ring connected with a wheelchair frame (concentric with the outer ring and positioned inside the outer ring); a plurality of rolling elements interposed between the outer ring and the inner ring, arranged with an interval between each other in a circumferential direction; and a plurality of spacers (retainers or interval-holding members) for holding intervals between the rolling elements. Each spacer is in a shape extending along a circumferential direction of the outer ring and the inner ring, and is provided between the rolling elements respectively. The wheel does not have a hub and spokes, and the inner peripheral side does not rotate, and further the wheel weight is light. The wheelchair of the present invention includes the wheel for a wheelchair.

12 Claims, 10 Drawing Sheets

U.S. PATENT DOCUMENTS

| | | | | |
|---|---|---|---|---|
| 1,645,620 A | * | 10/1927 | Page | 152/8 |
| 4,462,605 A | * | 7/1984 | Morgan et al. | 280/250.1 |
| 4,593,929 A | | 6/1986 | Williams | |
| 5,261,684 A | | 11/1993 | Soto | |

FOREIGN PATENT DOCUMENTS

| | | |
|---|---|---|
| JP | 62-66629 | 4/1987 |
| JP | 2960161 | 10/1999 |
| JP | 2000-342632 | 12/2000 |
| JP | 2001-299821 | 10/2001 |

\* cited by examiner

WHEELCHAIR, WHEEL FOR WHEELCHAIR, AND METHOD OF PRODUCING WHEEL FOR WHEELCHAIR

TECHNICAL FIELD

The present invention relates to wheelchairs, wheels for a wheelchair, and a method of manufacturing wheels for a wheelchair.

BACKGROUND ART

Figure 11:
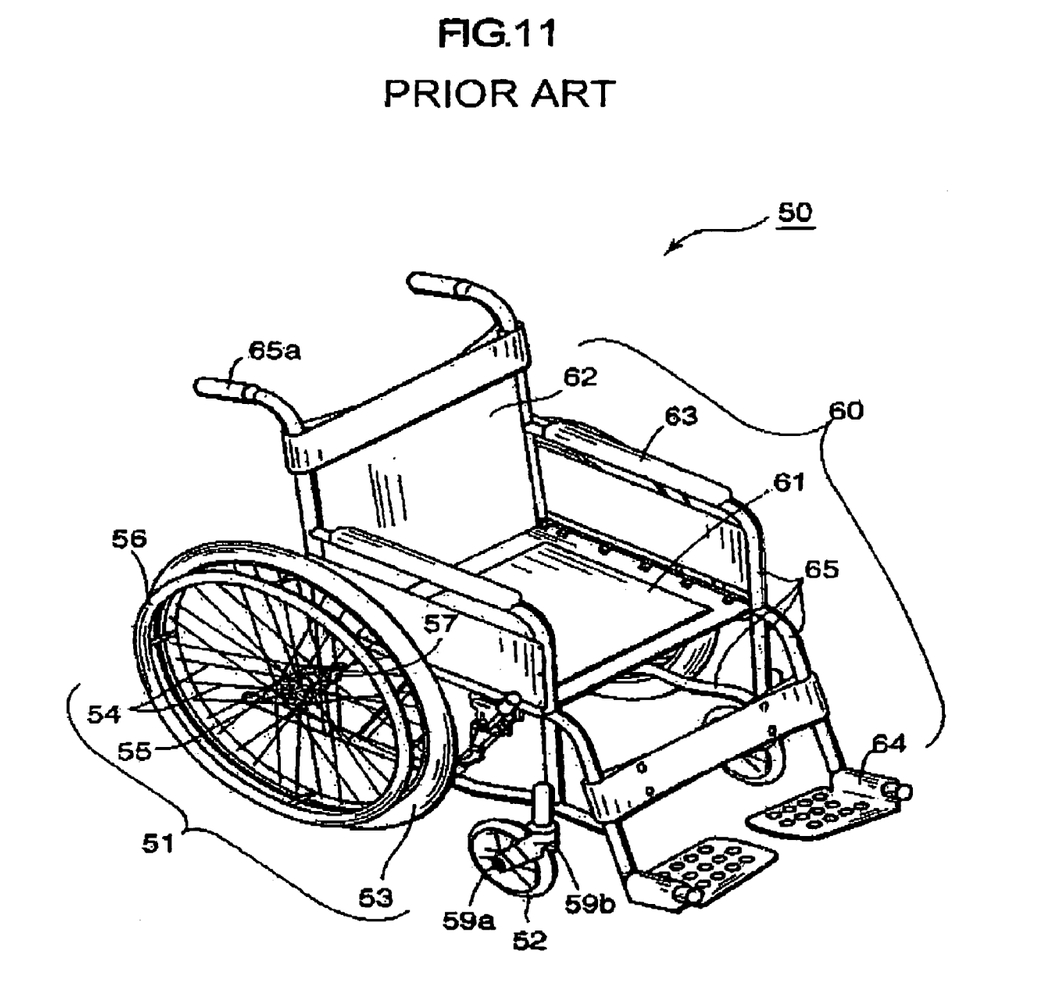
FIG. 11 is a perspective view showing a conventional, self-traveling manual wheelchair.

FIG. 11 is a perspective view showing a conventional self-traveling manual wheelchair 50. The wheelchair 50 has such a configuration that wheels are mounted to a chair unit 60. The wheels include large drive wheels 51 mounted on the transverse sides of the chair unit 60, and small casters 52 mounted on both front corners. The drive wheel 51 has such a configuration that a tire 53 is fixed to a hub 55 with spokes 54, and that a hand rim 56 for transmitting a driving force by a hand of a user is mounted to the drive wheel 51. The chair unit 60 consists of a seat surface 61, a back rest 62, arm rests 63, leg supports 64, and a frame 65 for connecting them so as to form the chair unit. Further, on the rear side top parts of the frame 65, grips 65a used when a carrier pushes the wheelchair are mounted.

The drive wheel 51 is connected of the chair unit 60 by mounting a hub mounting part 57 fixed to the frame 65 to the hub 55. Further, the casters 52 are connected in such a manner that holding members 59b are mounted to axes 59a provided at the center of the casters 52, and the holding members 59b are fixed to the frame 65.

Figures 12A, 12B, 12C:
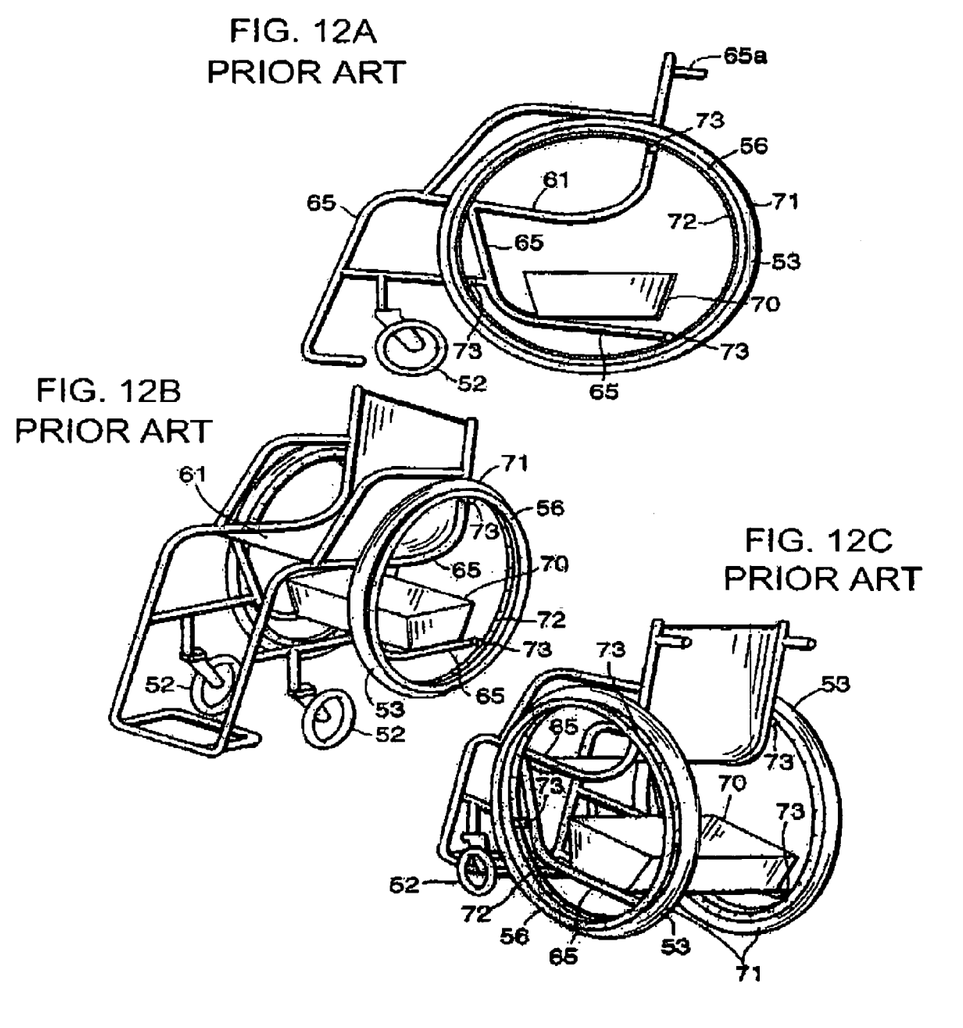

Although the configuration of the drive wheel 51 of a typically used wheelchair is that the tire 53 is fixed to the hub 55 with the spokes 54, as shown in FIG. 11 (conventional example 1), a drive wheel without a hub and spoken as recently been proposed. Specifically, as shown in FIG. 12 [A is a side view showing a wheelchair of a conventional example 2, B and C are perspective views thereof], a drive wheel 71 includes the tire 53, a rail part 72 mounted on the inner periphery thereof, and three pulleys 73 which are connected with the frame 65 of the wheelchair respectively. When the tire 53 rotates, the pulleys 73 travel on the rail part 72 in a state that the positions thereof are fixed with respect to the frame 65 (conventional example 2). (For example, see Japanese Patent Application Laid-Open Publication No. 2000-342632 (FIG. 1, FIG. 2, FIG. 5, and FIG. 6), Japanese Utility-Model Application Laid-Open Publication No. 62-66629, and Japanese Patent Application Laid-Open Publication No. 47-32550).

Figure 13A:
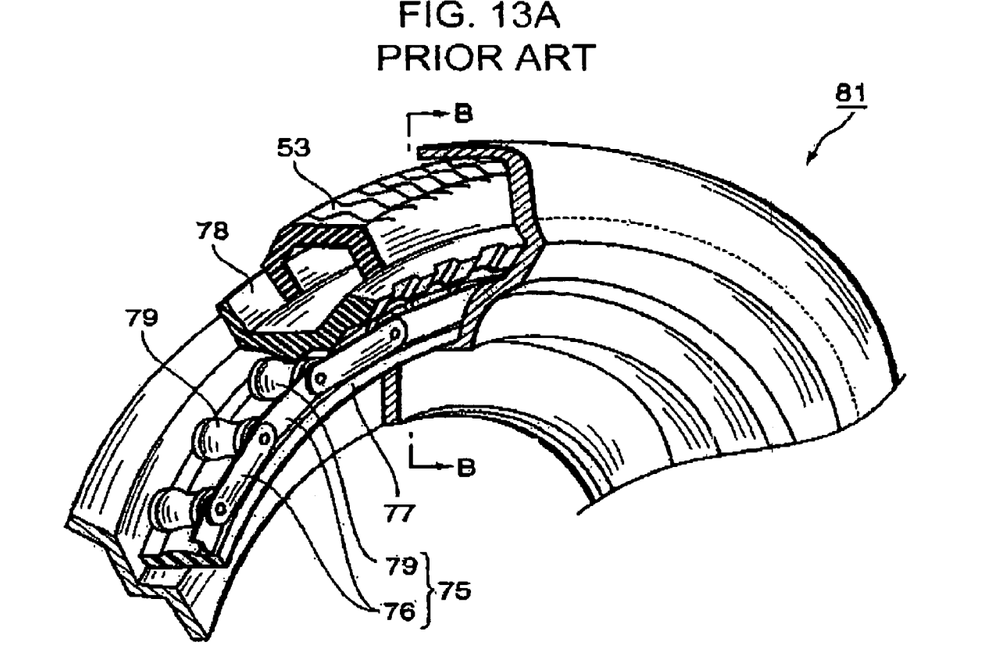
FIG. 13A is a diagram showing an exemplary wheelchair of the conventional example 3, in which a partially broken perspective view of a drive wheel thereof is shown.
Figure 13B:
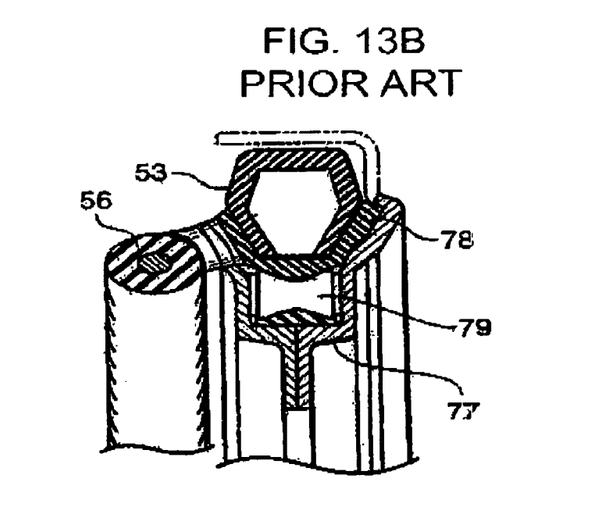
FIG. 13B is a sectional view taken along the line B-B shown in FIG. 13A.

Further, metallic rings which are doubled inside and outside like a rolling bearing mounted via rollers are proposed as another example of a drive wheel without a hub and spokes (conventional example 3). For example, as shown in FIG. 13 [A shows a wheelchair of the conventional example 3, which is a partially broken perspective view of a drive wheel 81 thereof, and B is a sectional view taken along the line B-B shown in A.], a roller chain 75 compose a plurality of rollers 79 and links 76 to connect the rollers 79, and the roller chain 75 is provided between, and is so configured that an outer ring 78 mounted on the inner periphery of a tire 53 and an inner ring 77 mounted inside thereof and mounted to the frame 65 (see Japanese Patent Publication No. 2960161 (p. 4, FIG. 1 to FIG. 3) and U.S. Pat. No. 4,593,929 (FIG. 65, FIG. 66)).

In these conventional examples 2 and 3, there is no spoke 54, different from the conventional example 1. Therefore, when a baggage basket 70 is provided right under the seat surface 61 of a wheelchair, this provides an advantage that a baggage can be put into or taken out of the baggage basket 70 easily (see FIG. 12).

DISCLOSURE OF THE INVENTION

The drive wheel of the conventional example 3 has an advantage that clothes are not rubbed and damaged even if the clothes contact the drive wheel since the inner peripheral side does not rotate. However, since the metallic wheels are doubled and a plurality of rollers are provided, the weight is heavy. In particular, a large force is required as a force to push the hand rims 56 when starting the wheelchair. Further, if the wheelchair itself is heavy, a large burden is placed on a carer, when the carer holds up the user on the wheel chair together with the wheelchair to walk up and down stairs or the like. In addition, the cost of a drive wheel of the conventional example 3 is high.

In view of the above, an object of the present invention is to provide a wheel for a wheelchair, a wheelchair itself, and a method of manufacturing a wheel for a wheelchair, in which the weight of the wheel is not heavy and the inner peripheral side of the wheel does not rotate.

A wheel for a wheelchair according to the present invention achieving this object comprises: an outer ring mounted on the inner periphery of a tire; an inner ring which is positioned concentrically inside the outer ring and fitted on a wheelchair frame; a plurality of rolling elements interposed between the outer ring and the inner ring, each rolling element being spaced out at intervals in a circumferential direction; and a plurality of spacers for maintaining said intervals between the rolling elements. Each spacer is in an elongated shape extending along a circumferential direction of the outer ring and the inner ring, and is provided between the rolling elements, respectively.

The rolling element is a part receiving the weight applied from the inner wheel to the outer ring (or from the outer ring to the inner ring), which is required to have a sufficient intensity, therefore it is difficult to make the rolling element itself lighter. However, the spacer for the interval between the rolling elements is only required to serve to prevent a contact between the rolling elements, therefor such a high intensity is not required, whereby it can be made lighter. By making the spacer have a shape extending along a peripheral direction, that is, a relatively long shape as described above, it is possible to reduce the number of rolling elements by increasing the arrangement ratio of the spacers, which can be made lighter, in a peripheral direction between the outer wheel and the inner ring, thereby, the weight of the wheel can be reduced as a whole. In addition, the configuration is simplified by reducing the number of rolling elements, therefore reducing the manufacturing cost.

In a case of a typical rolling bearing, a large number of rolling elements are disposed by making the interval between the rolling elements as short as possible, whereby the interval between the rolling elements has never been made large. However, in a case of a wheel for a wheelchair, having a strength capable of supporting the weight of a user and the weight of the wheelchair itself (at least the chair unit and the inner ring) is merely required. Usually, strength for supporting a weight less than 100 kg is enough, so it is possible to reduce the number of rolling elements. Accordingly, by setting the length of the spacer appropriately as described above, it is possible to adapt the number of rolling elements to the weight of a user and the weight of the wheelchair. As a result, the number of the rolling elements can be reduced as much as possible, and resistance caused by rolling of the rolling elements can be reduced, whereby it can preferably avoid wasting the user's physical energy.

Each spacer is in a pipe-shape or in a rod-shape, for example. A hollow spacer is preferable, since the weight can be further reduced. Further, in order to prevent inhibition of rotation of the rolling elements by contacting the spacer, it is preferable that at least the portions of the spacers in contact with the rolling elements be formed of a member be lubricated with respect to the rolling element. Alternatively, a lubricant may be applied to a contacting face of the spacer so as to reduce the contact resistance with respect to the rolling element.

Further, it is preferable that a contact face of each spacer be formed corresponding to the arcuate shape of the rolling face of the rolling element. When the contact face is formed along the arcuate shape of the rolling element in this way, rolling of the rolling element becomes smooth, and the state between the rolling elements and the spacers becomes stable. Further, when the spacer is in a pipe shape and a sphere (ball) is used as the rolling element, the ball can be disposed so as to be fit in an opening or "mouth" of the pipe-shaped spacer. Thereby, a state between the ball (rolling element) and the spacer becomes stable as described above, and each spacer can be manufactured by just cutting a pipe-shaped member, which is easy.

Further, it is desirable for the shape of the spacer in a longitudinal direction to be an arcuate shape adapting to the curvature of the annular space formed between the outer ring and inner ring. According to this shape, the spacers can be disposed with little (or no) contact with the outer ring and the inner ring, so there is little (or no) frictional resistance between the spacer and the outer ring and the inner ring. If the spacer is made of a flexible material, even though it is not formed by adapting to the curvature of the annular space accurately, or even it is a spacer of a linear shape, it can be disposed without any difficulty in a annular space by curving it. In this way, since a precise molding is not required, it is possible to form spacers at low cost, which leads to reduction in the manufacturing cost of wheels.

Further, if a lubricative material with respect to a rolling element, such as polyethylene terephthalate, polyacetal, or MC nylon, is used as a spacer, a rolling element rolls more smoothly, so the outer ring rotates more smoothly with respect to the inner ring.

As a type of rolling element, a roller or the like may be used instead of a ball and as its material, any material having strength capable of supporting the weight of a user and the wheelchair itself, for example, metal or synthetic resin, may be used.

A wheelchair according to the present invention is characterized of including the wheels for a wheelchair as described above. In particular, drive wheels of a wheelchair are large in size generally, so an effect of reducing weight or the like is significant. Therefore, it is preferable to apply the wheels for a wheelchair described above to this drive wheel.

Further, a method of manufacturing a wheel for a wheelchair according to the present invention is a method of manufacturing for a wheel for a wheel chair including: an outer ring mounted on the inner periphery of a tire; an inner ring which is concentric with the outer ring, positioned inside the outer ring, and connected to a wheelchair frame; a plurality of rolling elements interposed between the outer ring and the inner ring; and spacers provided between the rolling elements, respectively. The method comprises the steps of: determining the number of rolling elements adapting to a wheelchair user (hereinafter may be referred to as a number determining step); determining the length of the spacers according to the number of rolling elements determined and the circumferential length of a circumferential space (annular space) defined between the outer ring and the inner ring (hereinafter may be referred to as a length determining step); and disposing the rolling elements and the spacers between the outer ring and the inner ring (hereinafter may be referred to as an assembling step).

In this way, by changing the number of rolling elements and the length of spacers corresponding to the weight of a user or the like, it is possible to reduce the weight of a wheel for a wheelchair by further reducing the number of the rolling elements, in a case of a light weight user. On the other hand, it is possible to form a wheel having the number of rolling elements capable of keeping a sufficient strength while reducing the weight, in a case of a heavy weight user.

Further, it is preferable to prepare a flexible long member beforehand as a spacer, which is cut corresponding to the length of the spacer determined by the length determining step so as to form the spacers (hereinafter, this step may be referred to as a spacer producing step). According to this, it is not necessary to prepare spacers of various lengths, whereby the manufacturing cost can be reduced.

BRIEF DESCRIPTION OF THE DRAWINGS

FIG. 6A is a side view diagram.

FIG. 12A is a side view diagram, and FIGS. 12B and 12C are corresponding perspective views, showing a wheelchair of the convention example 2.

BEST MODE FOR CARRYING OUT THE INVENTION

Embodiment 1

Figure 1:
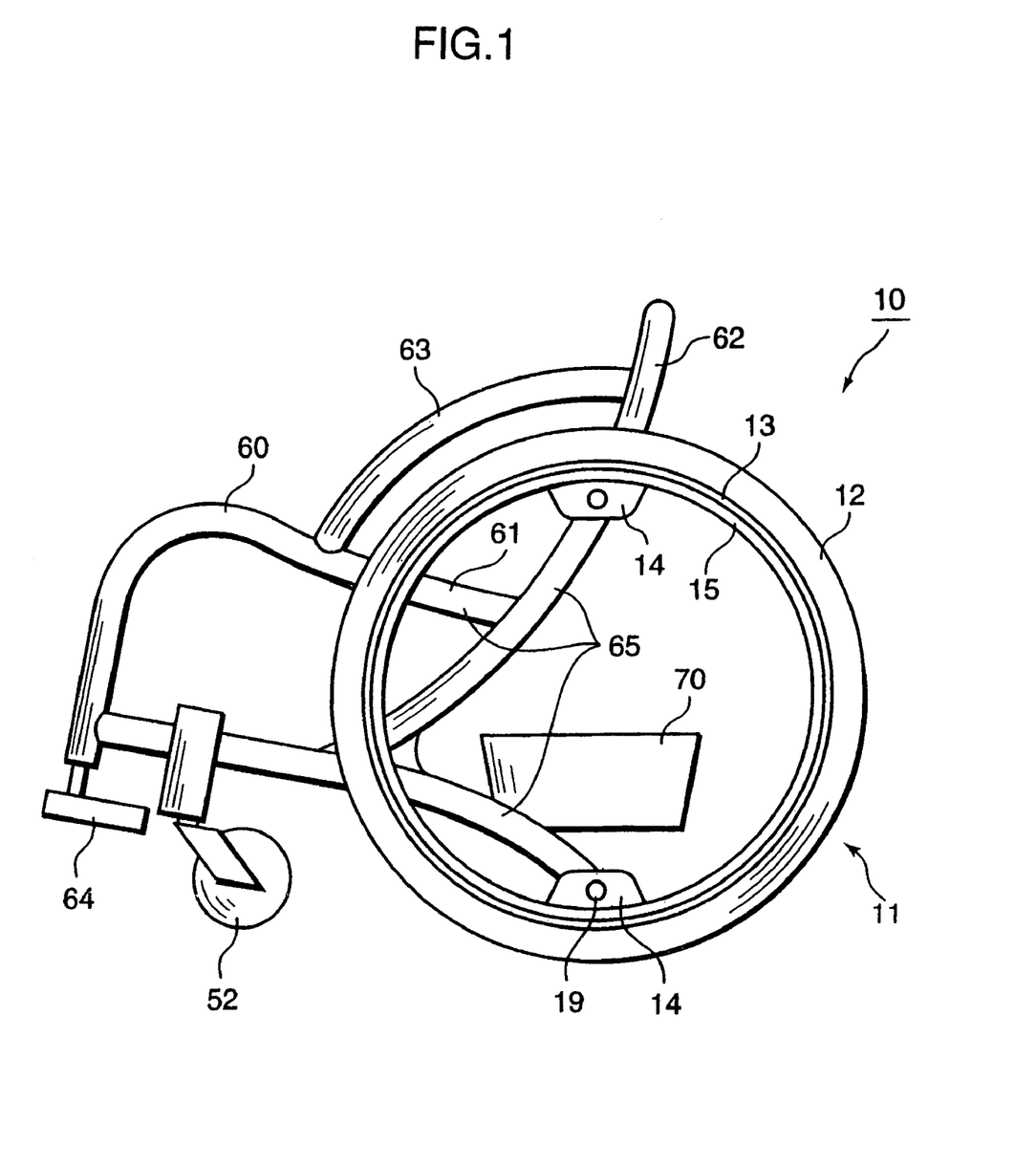
FIG. 1 is a side view showing a wheelchair according to an embodiment 1 of the present invention.
Figure 2A:
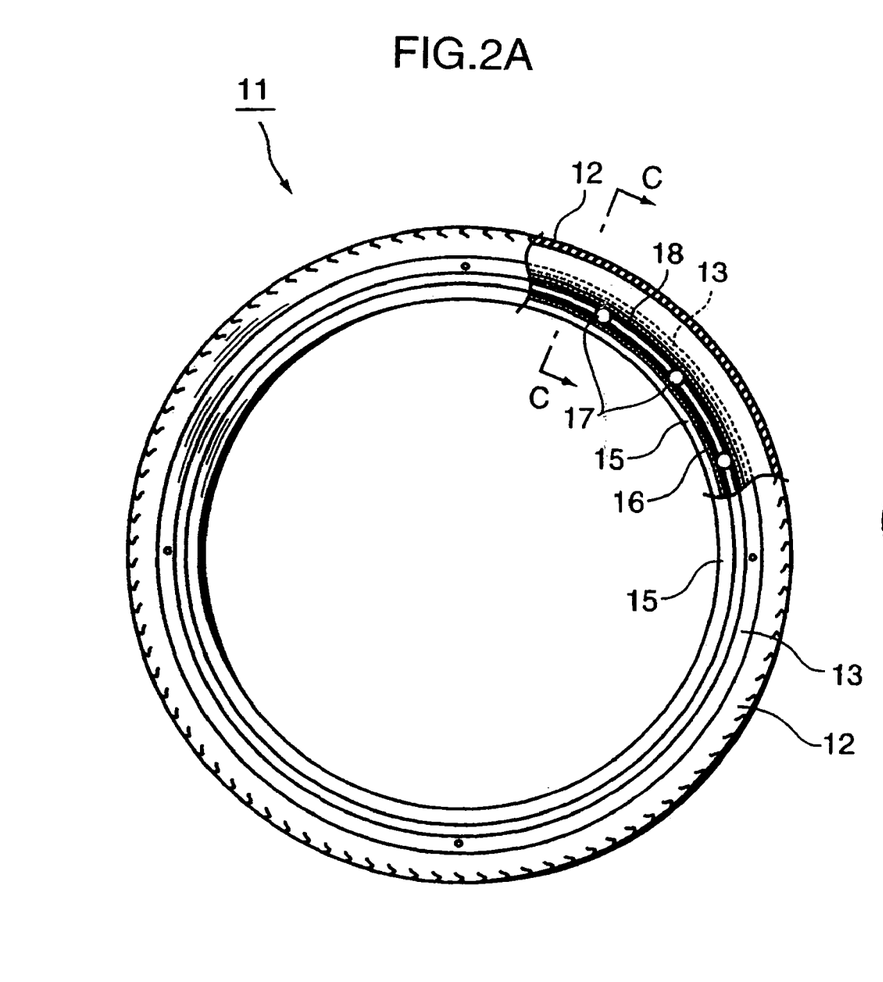
FIG. 2A is a partially broken side view showing a drive wheel of the wheelchair of the embodiment 1.
Figure 2B:
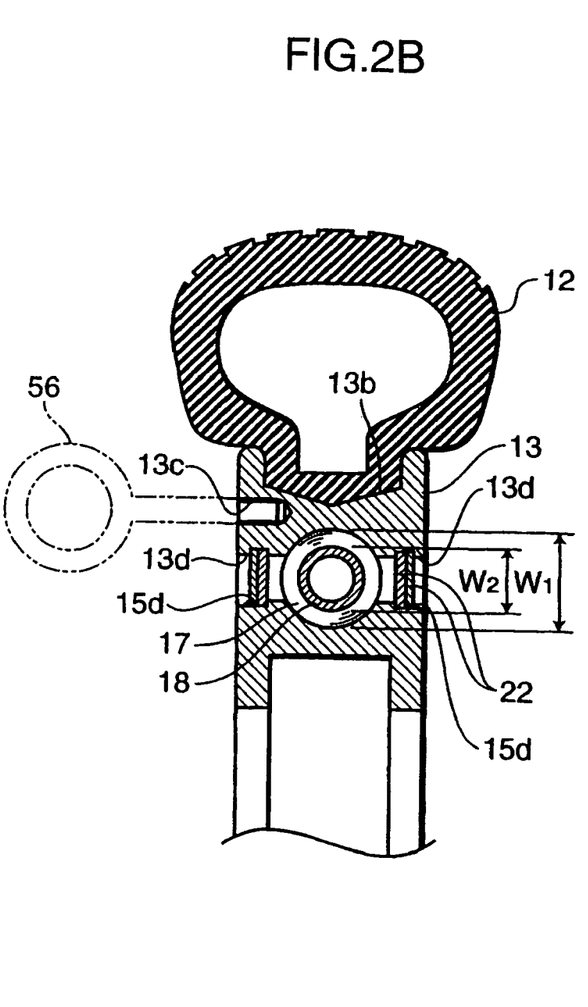
FIG. 2B is a sectional enlarged view taken along the line C-C shown in FIG. 2A.
Figure 3:
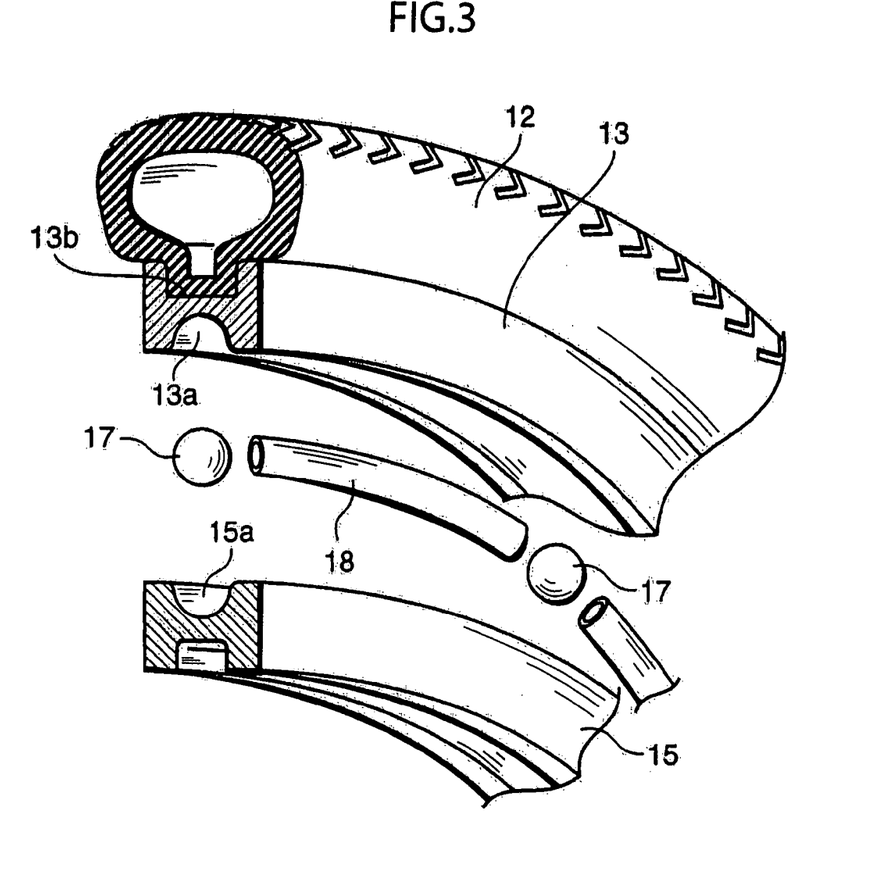
FIG. 3 is a one-side sectional exploded perspective view of a drive wheel in the embodiment 1.

FIG. 1 is a side view showing a wheelchair 10 according to an embodiment 1 of the present invention. Hand rims 56 are omitted in Figure. Further, FIG. 2A is a partially broken side view showing a drive wheel 11 of the wheelchair 10, and FIG. 2B is a sectional enlarged view taken along the line C-C shown in FIG. 2A. FIG. 3 is a exploded perspective view of the drive wheel 11. The same components as those in FIG. 11 and FIG. 12 are denoted by the same reference numerals, and overlapping explanations are omitted.

The drive wheel 11 consists of a rubber tire 12, a metallic (e.g., aluminum) outer ring 13 mounted on the inner periphery of the tire 12, a metallic (e.g., aluminum) inner ring 15 which is concentric with the outer wheel 13 and positioned inside the outer ring 13, twelve balls (rolling elements) 17 interposed between the outer ring 13 and the inner ring 15, twelve retainers (spacers) 18 interposed between the balls 17, and a mounting member for a frame 14 mounted to the wheelchair frame 65.

The ball 17 is a sphere made of metal or hard synthetic resin such as phenol resin. On the other hand in which arcuate grooves 13a and 15a are formed in opposite faces of the outer ring 13 and the inner ring 15, respectively, so as to fit to the ball 17, as shown in FIG. 3. That is, the diameter of the ball 17 is the same as the spacers $W_1$ between groove 13a and groove 15a of an annular space 16 formed by the groove 13a of the outer ring 13 and the inner wheel 15. The sizes of the plural balls 17 are the same.

Figure 4:
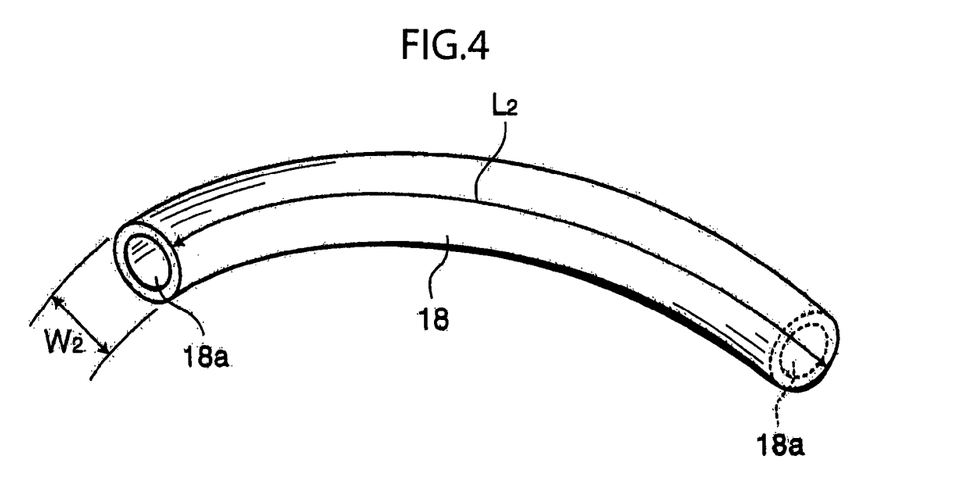
FIG. 4 is an enlarged perspective view showing a retainer in the embodiment 1.

FIG. 4 is an enlarged perspective view showing the retainer 18. The retainer 18 is made of flexible synthetic resin such as polyethylene terephthalate and the like, and is in a pipe shape. The longitudinal direction thereof is curved arcuately so as to be almost along the curvature in a peripheral direction of the annular space 16. The ball 17 is fit in an opening 18a at an end of the retainer 18. The width $W_2$ of the retainer 18 is smaller than the width $W_1$ of the annular space 16, and the length $L_2$ is a distance between the ball 17 and the ball 17 (FIG. 2B, FIG. 4). All of the plural retainers 18 have the same diameter $W_2$ and the same length $L_2$, respectively.

The outer ring 13 has a tire mounting members groove 13b formed in the outer peripheral face thereof, and the tire 12 is mounted thereto, as described above. Further, the outer ring 13 has a handle mounting members hole 13c to which a handle rim 56 is mounted (FIG. 2B).

Figure 5:
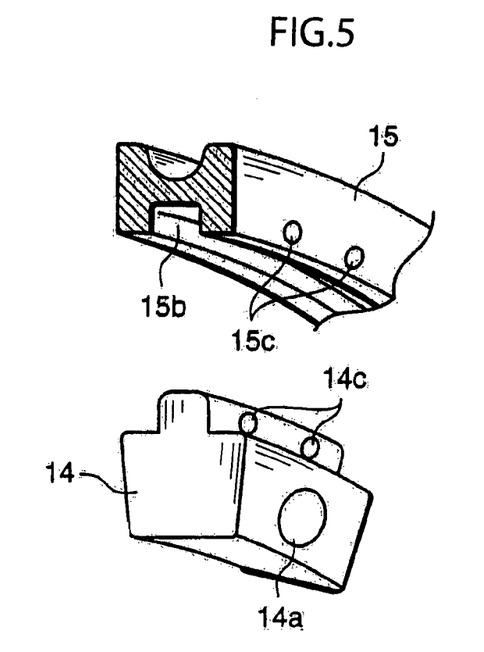
FIG. 5 is a one-side sectional exploded perspective view showing an inner wheel and a mounting member for a frame in the embodiment 1.

FIG. 5 is a exploded perspective view showing the inner ring 15 and the mounting member 14 for a frame. The inner peripheral face of the inner ring 15 has a mounting groove 15b into which the mounting member for a frame 14 can be fitted and screwed. In FIG. 5, 15c shows a screw hole formed in the inner ring, and 14c is a screw hole for fixing the inner ring, formed in the mounting member for a frame 14.

The mounting member for a frame 14 is further screwed to the frame 65 with mounting screws 19. In FIG. 5, 14a is a screw hole for fixing the frame, formed in the mounting member for a frame 14 (FIGS. 1, 5).

In this way, the inner ring 15 is connected with the wheelchair frame 65 via the mounting member 14 for a frame. As shown in FIG. 1, in the present embodiment, the inner ring 15 is fixed at two points of an upper part and a lower part of the inner ring so a large space is provided inside the drive wheel. As shown in FIG. 2B, to bank parts 13d and 15d on the both lateral sides of the grooves 13a and 10a (see also FIG. 3) in the opposite faces of the outer wheel 13 and the inner ring 15, seal 22 are mounted so as to prevent mud or the like from entering into the annular space 16.

Next, a method of manufacturing the drive wheel 11 will be described.

The weight of a wheelchair 10 itself does not differ a lot from one to another, but the load applied to the drive wheel 11 varies depending on the weight of a user. Therefore, first, the number of balls 17 required for supporting the load of a user and the wheelchair 10 itself is determined in consideration of the weight of the user (twelve balls in the example shown) (number determining step). Next, the length $L_2$ of the retainer 18 is determined, based on the number of balls (length determining step). At this time, if the balls 17 are arranged evenly on the circumference of the annular space 16, the lengths of respective retainers 18 are set to be the same. For example, if twelve balls 17 having a diameter of 16 mm are used in a case where the diameter of the annular space 16 (which is a diameter of a circle pass through the center of the spacers $W_1$, that is, a diameter of a circle defined by lines connecting the center of the balls 17 and the central axis of the retainers 18 arranged) is 512 mm, the length $L_2$ of each retainer 18 is 118 mm. Next, a long flexible pipe member, curved almost along the curvature of the annular space 16 is prepared, and the flexible pipe member is cut to have the length $L_2$ and is used as the retainer 18 (spacers-member producing step). Then, inside the annular space 16, the number of balls 17 and the retainers 18, determined as described above, are arranged alternately (arranged such that a part of the ball 17 is fit in an opening 18a of the retainer 18), and the outer ring 13 and the inner ring 15 are assembled (assembling step), whereby the drive wheel 11 is completed.

When driving the wheelchair 10, the hand rims 56 are rowed so as to rotate the tires 12 with the outer rings 13, whereby the wheelchair 10 travels. At this time, the balls 17 roll inside the groove 13a of the outer ring 13 and inside the groove 15a of the inner ring 15, and the inner ring 15 is not rotated. Further, the balls 17 receive the load of the chair unit 60 applied to the inner ring 15, and the load is further received by the outer ring 13 and is supported on the ground by the tires 12.

The drive wheel 11 of the present embodiment 1 uses only twelve balls 17, and the material itself of the retainer 18 is light, and further, it is hollow, so the drive wheel 11 is relatively light as a whole. Consequently, the weight of the wheelchair 10 as a whole is also light. Accordingly, the load placed on a user of the wheelchair when the user rows the wheelchair is reduced. Further, since the configuration of the drive wheel 11 is relatively simple, the manufacturing cost is also reduced. Moreover, since the inner ring 15 does not rotate during traveling of the wheelchair 10, clothes are not rubbed and damaged even if the clothes contact the inner ring 15. Further, since there is no spoke or the like inside the drive wheel 11 so a large space is provided, and baggage can be put into or taken out against the baggage basket 70 under the seat surface.

Further, the retainer 18 made of polyethylene terephthalate has the lubricity with respect to the ball 17, whereby rotation of the drive wheel 11 is performed smoothly.

Embodiment 2

Figure 6A:
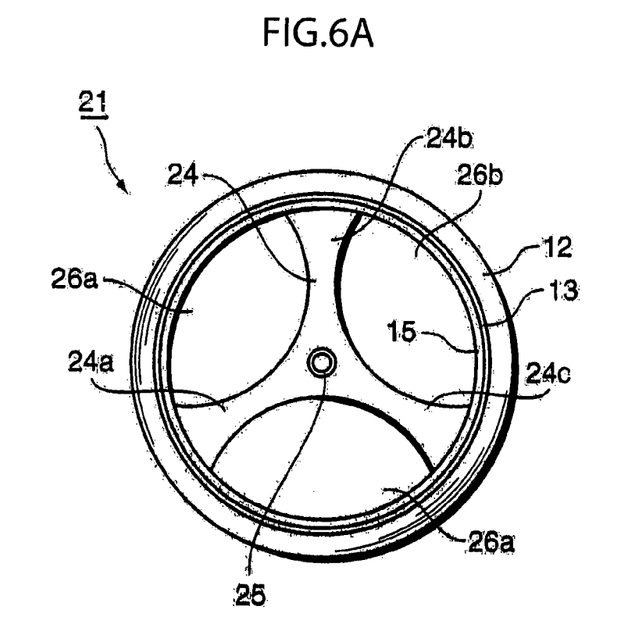
Figure 6B:
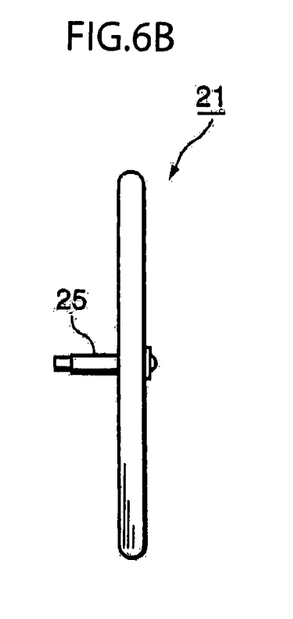
FIG. 6B is a corresponding front view diagram, showing a drive wheel (wheel for wheel chair) according to an embodiment 2 of the present invention.

FIG. 6A is a side view showing a drive wheel (wheel for a wheelchair) 21 according to an embodiment 2 of the present invention, and FIG. 6B is a front view thereof.

The drive wheel 21 of the second embodiment 2 is one in which the mounting member for a frame 14 in the drive wheel 11 of the embodiment 1 is replaced with a mounting member for a hub 24, and the other configuration is the same as that of the drive wheel 11 of the embodiment 1.

The mounting member for a hub 24 has leg parts 24a, 24b and 24c extending in three directions from the rotational center (rotational centers of the inner wheel 15 and the outer ring 13) of the drive wheel 21, and spaces 26a, 26b and 26c are defined between the leg parts 24a, 24b and 24c, respectively. The top parts of the leg parts 24a, 24b and 24c are fixed by welding to the inner peripheral face of the inner ring 15. Further, to the rotational center of the drive wheel 21, a connecting member 25 extending toward the chair unit 60 side is provided, which is attachable/detachable to the hub mounting members part 57 of a wheelchair having the hub 55 like the conventional example 1.

Figure 7A:
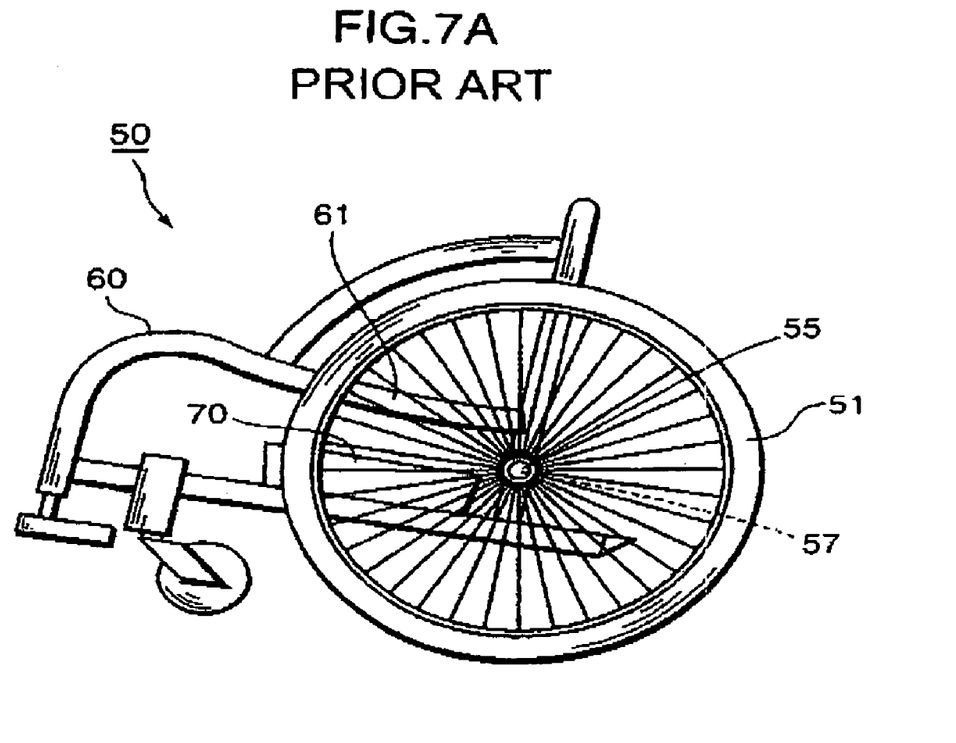
FIG. 7A is a side view diagram illustrating a state of an existing drive wheel of a wheelchair (eg. wheelchair of the conventional example 1)
Figure 7B:
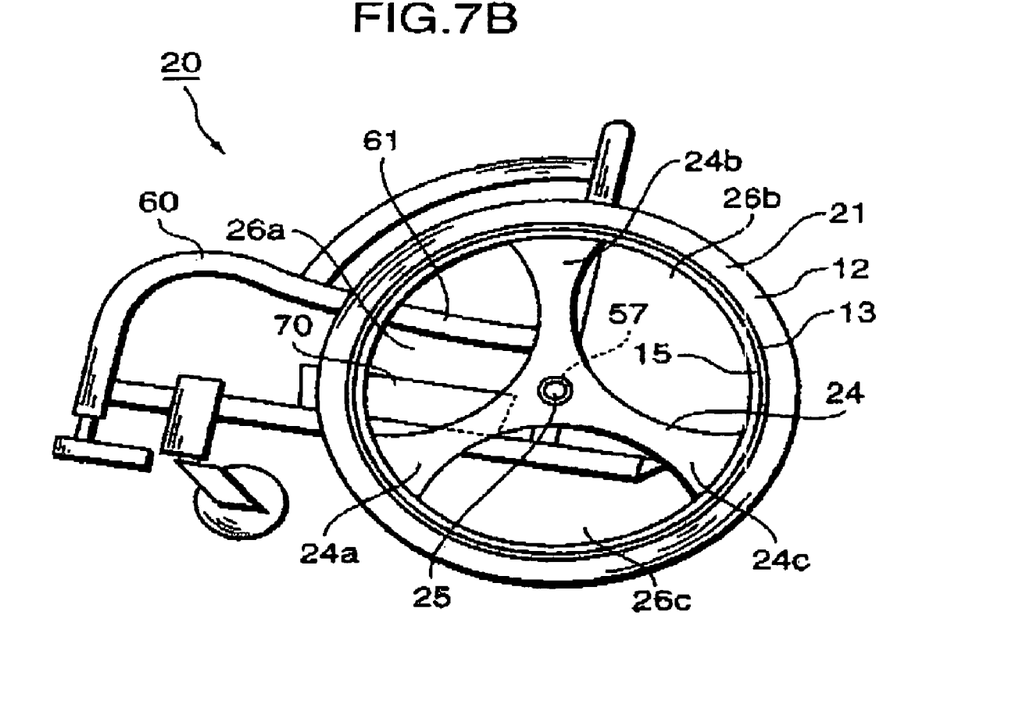
FIG. 7B is a side view diagram, showing a state in which the conventional wheel is replaced with a drive wheel of the present embodiment 2.

FIG. 7 is a diagram illustrating a state where the drive wheel 51 of an existing wheelchair (e.g., a wheelchair of the conventional example 1) is replaced with the drive wheel 21 of the present embodiment 2, FIG. 7A is a side view showing the state of the existing wheelchair, and FIG. 7B is a side view showing a state where the wheel is replaced with that of the present embodiment 2. The hand rim 56 is omitted in Figure.

In the existing wheelchair 50 having a hub, the drive wheel 51 is attachable/detachable in general (FIG. 7A), and this drive wheel 51 is detached and the drive wheel 21 of the embodiment 2 is attached to the hub mounting members part 57 (FIG. 7B). By using the drive wheel 21 in this way, the existing wheelchair 50 with a hub and spokes can be changed to a wheelchair 20 without a hub and spokes.

In the wheelchair 20 with the drive wheel 21 of the embodiment 2, the inner ring 15 and the mounting member for a hub 24 do not rotate. Therefore, even when clothes or the like contact the inner ring 15 or the mounting member for a hub 24, the clothes will never be rubbed and damaged, as same as the case of the embodiment 1. Further, three large spaces 26a, 26b and 26c are defined inside the drive wheel 21, so baggage can be easily put into or taken out from the baggage basket 70 under the seat surface 61.

Embodiment 3

Figure 8:
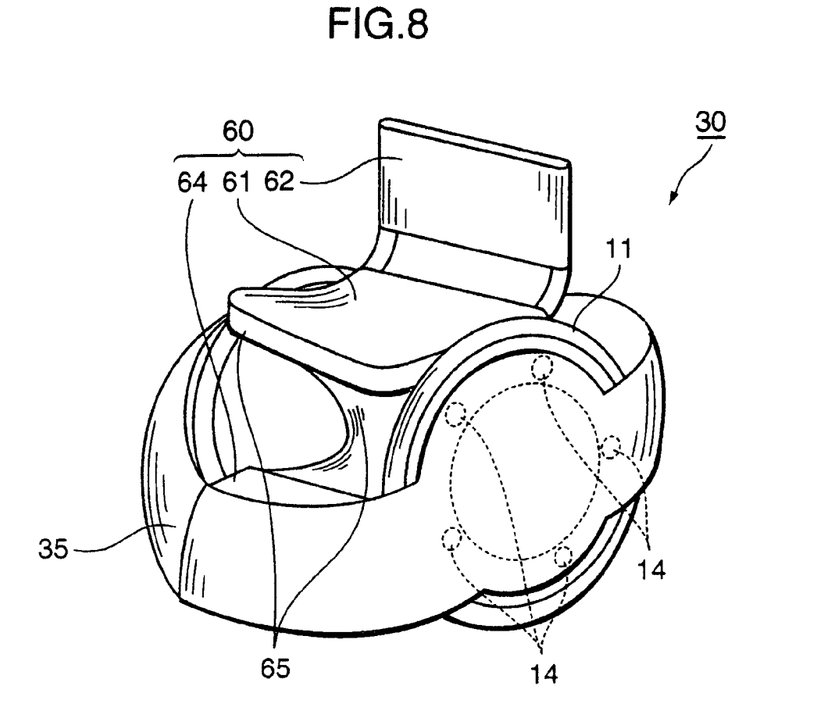
FIG. 8 is a perspective view showing a wheelchair according to an embodiment 3 of the present invention.

FIG. 8 is a perspective view showing a wheelchair 30 according to an embodiment 3 of the present invention, which is a wheelchair for playing quad rugby.

A drive wheel of the wheelchair 30 of the embodiment 3 is the same as the drive wheel 11 used in the embodiment 1, provided that the drive wheel 30 is mounted to the frame 65 via the mounting member 14 for a frame at five points in the present embodiment 3, although the drive wheel 11 is mounted to the frame 65 at two points in the embodiment 1. Further, protective boards 35 are disposed so as to surround the chair unit 60, the drive wheel 11 and casters (not shown) of the wheelchair.

Quad rugby is a strenuous sport in which wheelchairs crash into each other. Therefore, since the chair unit 60 and the drive wheel 51 are connected via the hub 55 like the conventional example 1, a shock applied to the drive wheel 51 concentrates on the hub 55, whereby the wheel rotating axis of the hub 55 is deformed, as a result, defective traveling may be caused. In this aspect, in the present embodiment 3, the chair unit 60 and the drive wheel 11 are connected at five points via the mounting member 14 for a frame, whereby a shock applied to the drive wheel 11 is dispersed, so the drive wheel 11 is less likely to be deformed and seldom causes defective traveling.

According to the wheelchair of the present invention as described above, by increasing the contacting points between the frame 65 and the drive wheel 11, the intensity is improved.

Therefore, the wheelchair is usable for a strenuous sport such as quad rugby. Further, the intensity can also be improved not only by relatively increasing the connecting parts between the frame 65 and the drive wheel 11 but also by increasing the width of the connecting parts.

As described above, wheelchairs, wheels for wheelchairs, and a method of manufacturing wheels for wheelchairs according to the present invention have been explained specifically with reference to the drawings showing examples. However, the present invention is not limited to the examples shown, and may be carried out by applying appropriate modifications within the scope adaptable to the purport described above, all of which are included in the technical scope of the present invention.

For example, although a pipe-shaped retainer is used as the retainers (spacers) 18 in the embodiments described above, it is not limited to this shape and may be a rod shape for example, or may be a continued shape by connecting adjacent retainers at a part. Further, in producing the retainer 18 in the embodiments described above, a long material which has been curved almost along the curvature of the annular space 16 is used as the material. However, if the retainer is made of a flexible material, it is not necessarily along the curvature of the annular space 16, and may be in a linear shape. Since the retainer is made of a flexible material, it can be made to be along the curvature of the annular space 16 easily.

Further, although lengths of a plurality of retainers 18 are the same in the embodiments described above, lengths of the respective retainers 18 may be different. In such a case, the load can be supported more firmly by arranging the retainers 18 and the balls 17 in the ring-ring space 16 in such a manner that a larger number of balls 17 are positioned in the lower part of the wheel. However, if it is expected that the positions of the retainers 18 and the balls 17 are shifted by driving the wheelchair, it is preferable for the balls 17 to be arranged evenly as the embodiment 1. In a case of the lengths of the retainers 18 being different, the number of balls 17 positioned in the lower part may be reduced due to a shift. In such a case, the load of the weight or the like of the user concentrates on the reduced number of balls 17, so a problem may be caused in the aspect of intensity. However, in the case of one in which balls 17 are arranged evenly, a constant intensity can be kept with any shift.

Figure 9:
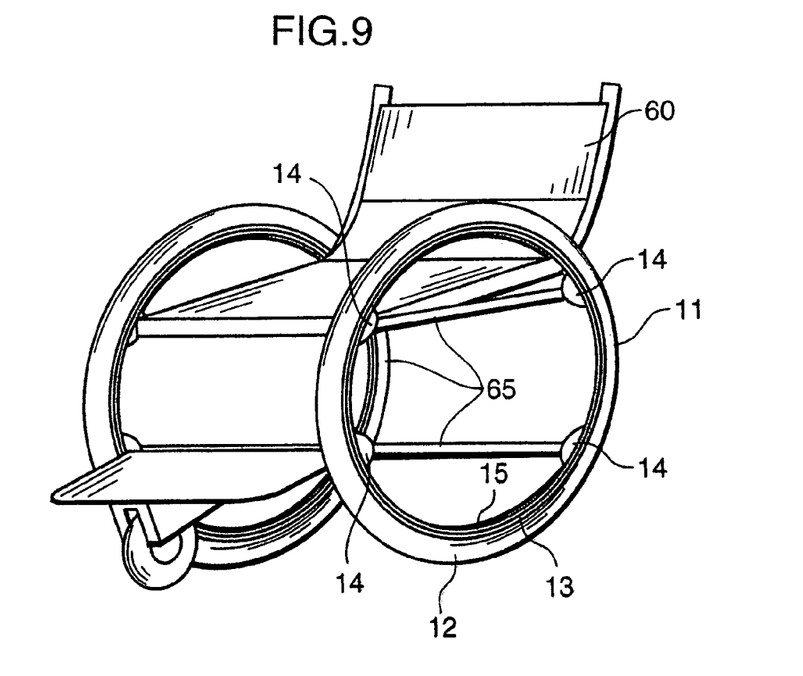
FIG. 9 is a perspective view showing another example of a wheelchair according to the present invention.
Figure 10:
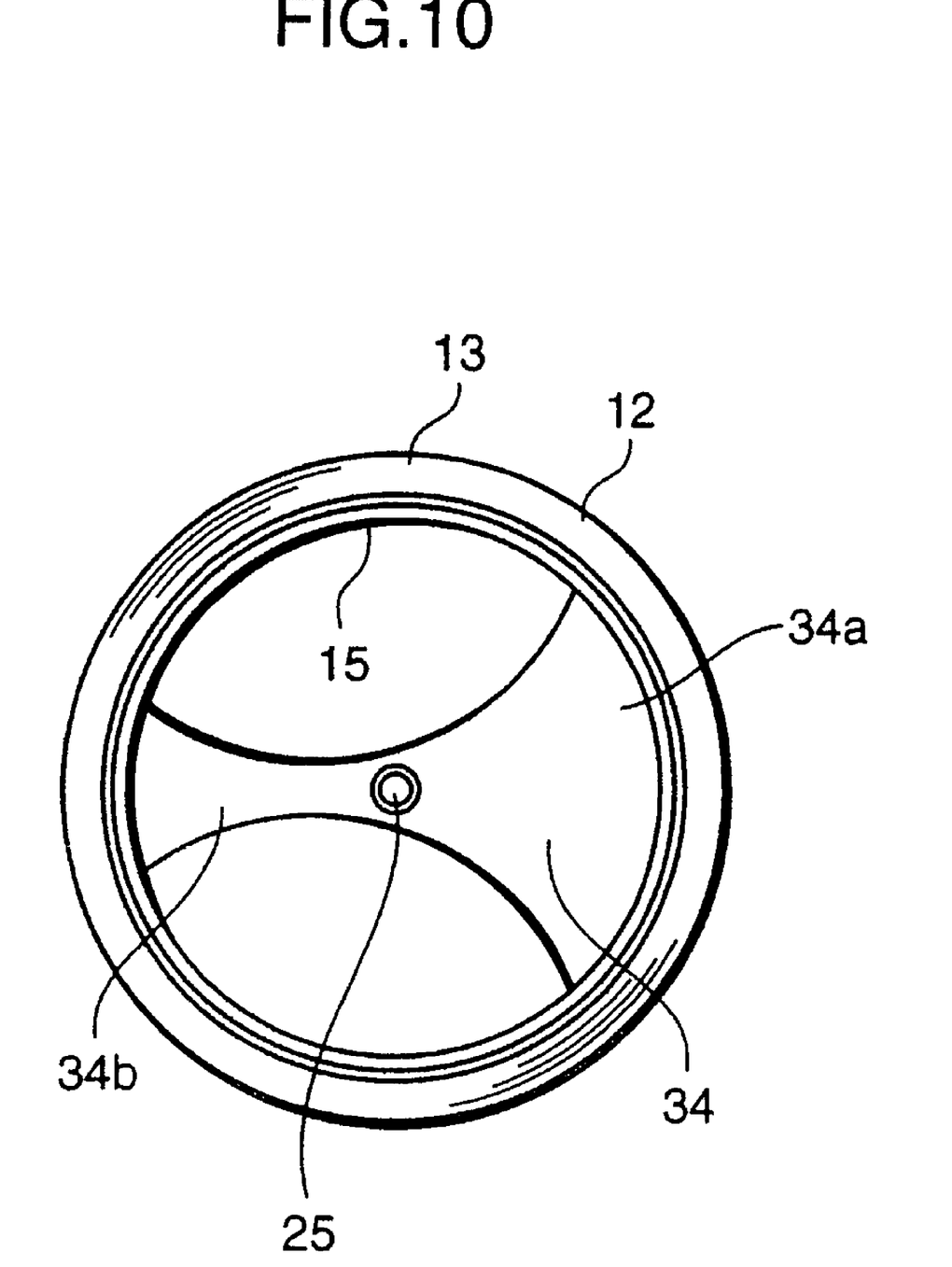
FIG. 10 is a side view showing another example of a wheel for a wheelchair according to the present invention.

Further, the connecting points of the inner ring 15 with respect to the frame 65 are two points in the embodiment 1, and are five points in the embodiment 3. However, the present invention is not limited to these numbers of the connecting points. For example, as shown in FIG. 9 [a perspective view showing another example of a wheelchair according to the present invention], it may be fixed at four points with the four mounting members 14 for a frame, or may be fixed at one point, three points or six points or more. Further, although the mounting member for a hub 24 which is divided in three extending ways is used in the embodiment 2, the present invention is not limited to the mounting member for a hub 24 which is divided in three extending ways. For example, the mounting member for a hub 34 in which two legs 34a and 34b are extending as shown in FIG. 10 [a side view showing another example of a wheel for a wheelchair according to the present invention], or a mounting member for a hub having four or more legs may be used. However, if a mounting member for a hub has too many legs, the space inside the drive wheel cannot be made large. Therefore, in view of this point, the legs should not be too many.

Although it is needless to say that the drive wheel 11 described by using FIG. 2 and the like is preferable as a wheelchair, it is also applicable to other uses.

As described above, wheels for a wheelchair and wheelchairs according to the present invention are light, so a load placed when carrying it by a wheelchair user is reduced, and a burden placed when a carrier holds the wheelchair with the user for example, is also reduced. In addition, since the configuration is simple, the manufacturing cost is not high. Further, since the inside of a wheel does not rotate, there is no concern about clothes being damaged by being rubbed. Moreover, since a sufficiently large space can be provided inside the wheel baggage can be put in or taken from under the seat surface easily by using such a space.

Further, according to the method of manufacturing a wheel for a wheelchair of the present invention, it is possible to manufacture a wheel for a wheelchair as described above appropriately.

The invention claimed is:

1. A wheel for a wheelchair comprising:
an outer ring mounted on an inner periphery of a tire;
an inner ring which is positioned concentrically inside the outer ring, and fitted on a wheelchair frame;
a plurality of rolling elements interposed between the outer ring and the inner ring, each rolling element being spaced at intervals in a circumferential direction; and
a plurality of spacers for maintaining said intervals between the rolling elements, wherein
each spacer is in an elongated shape along a circumferential direction of the outer ring and the inner ring, and each of the spacers and each of the rolling elements are alternatively provided along the circumferential direction.

2. The wheel for the wheelchair as claimed in claim 1, wherein the spacer is made of a flexible material and is bent along the circumferential direction.

3. A wheel for a wheelchair comprising:
an outer ring mounted on an inner periphery of a tire;
an inner ring which is positioned concentrically inside the outer ring, and fitted on a wheelchair frame;
a plurality of rolling elements interposed between the outer ring and the inner ring, each rolling element being spaced at intervals in a circumferential direction; and
a plurality of spacers for maintaining said intervals between the rolling elements, wherein
each spacer is in an elongated shape along a circumferential direction of the outer ring and the inner ring, and each of the spacers and each of the rolling elements are alternatively provided along the circumferential direction; and
wherein each rolling element is spherically-shaped and each spacer is pipe-shaped, and each rolling element is in contact with an opening mouth of a spacer.

4. A wheelchair having a wheel according to claim 1.

5. A wheelchair having a wheel according to claim 2.

6. A wheelchair having a wheel according to claim 3.

7. A method of manufacturing a wheel for a wheelchair having an outer ring mounted on an inner periphery of a tire, an inner ring which is positioned concentrically inside the outer ring and defining an annular space therebetween, the inner ring being fitted on a wheelchair frame, a plurality of rolling elements interposed between the outer ring and the inner ring, and spacers provided between the rolling elements, respectively, the method comprising the steps of:
determining a number of the rolling elements adapted to suit a wheelchair user;
determining a length of each spacer according to the number of rolling elements determined and a circumferential length of the annular space defined between the outer ring and the inner ring; and
disposing the rolling elements and the spacers between the outer ring and the inner ring in a manner that each of the spacers is arranged between adjacent rolling elements.

8. The method of manufacturing the wheel for the wheelchair as claimed in claim 7, further including the step of cutting a flexible member corresponding to the length of each spacer determined so as to form each spacer.

9. The wheel for a wheelchair according to claim 1, wherein each spacer is made of lubricative material at least in an area in contact with the rolling element.

10. The wheel for a wheelchair according to claim 9, wherein the spacers are made of polyethylene terephthalate.

11. The wheel for a wheelchair according to claim 1, wherein each spacer has a same length.

12. The wheel for a wheelchair according to claim 1, wherein the wheel is used as a drive wheel for the wheelchair.

* * * * *